United States Patent
Senda et al.

(10) Patent No.: US 8,246,517 B2
(45) Date of Patent: Aug. 21, 2012

(54) AUTOMATIC STOP/START CONTROLLER FOR INTERNAL COMBUSTION ENGINE

(75) Inventors: Takashi Senda, Niwa-gun (JP); Akira Katoh, Anjo (JP); Kenji Kawahara, Kariya (JP)

(73) Assignee: Denso Corporation, Kariya (JP)

( * ) Notice: Subject to any disclaimer, the term of this patent is extended or adjusted under 35 U.S.C. 154(b) by 408 days.

(21) Appl. No.: 12/686,205

(22) Filed: Jan. 12, 2010

(65) Prior Publication Data

US 2010/0184562 A1 Jul. 22, 2010

(30) Foreign Application Priority Data

Jan. 16, 2009 (JP) ................................. 2009-7192

(51) Int. Cl.
*F16H 59/30* (2006.01)
(52) U.S. Cl. ........................................................ 477/121
(58) Field of Classification Search .................. 477/107, 477/83, 90, 109, 121, 99
See application file for complete search history.

(56) References Cited

U.S. PATENT DOCUMENTS 6,702,718 B2 * 3/2004 Tani et al. ...................... 477/203
2011/0136622 A1 * 6/2011 Enoki ............................ 477/83

FOREIGN PATENT DOCUMENTS

| JP | 59-141134 | 9/1984 |
|---|---|---|
| JP | 8-189395 | 7/1996 |
| JP | 2006-153246 | 6/2006 |

OTHER PUBLICATIONS

Japanese Office Action dated Oct. 6, 2010 issued in corresponding Japanese Application No. 2009-007192, with English Translation.

* cited by examiner

*Primary Examiner* — David D Le
*Assistant Examiner* — David J Hlavka
(74) *Attorney, Agent, or Firm* — Nixon & Vanderhye PC

(57) ABSTRACT

A controller stops a fuel injection when a vehicle is in a specified decelerate condition where the vehicle likely stops and an automatic stop requirement is generated. An input shaft and an output shaft of a shift transmission mechanism are directly connected with each other through a direct connector so that a driving power is transmitted from an engine to a driving shaft through a power transmitter which permits a sliding between an input shaft and an output shaft thereof. When a restart requirement is generated before the vehicle is completely stopped, the engine is restarted under a condition where the input shaft and the output shaft of the shift transmission mechanism are connected with each other by a direct connector. When the restart requirement is not generated before the vehicle is completely stopped, the input shaft and the output shaft are disconnected when the vehicle is completely stopped.

4 Claims, 5 Drawing Sheets

AUTOMATIC STOP/START CONTROLLER FOR INTERNAL COMBUSTION ENGINE

CROSS-REFERENCE TO RELATED APPLICATION

This application is based on Japanese Patent Application No. 2009-7192 filed on Jan. 16, 2009, the disclosure of which is incorporated herein by reference.

FIELD OF THE INVENTION

The present invention relates to an automatic stop/start controller for an internal combustion engine of a vehicle in which a driving power of the engine is transmitted to a driving shaft of the vehicle through an automatic transmission.

BACKGROUND OF THE INVENTION

A vehicle equipped with an automatic engine stop/start control system (an idle reduction control system) has been developed in order to improve fuel economy and reduce emission. In a conventional automatic engine stop/start control system, when a driver stops a vehicle, a fuel injection is stopped to stop the engine (fuel cut) automatically. Then, when the driver operates to start the vehicle, a starter automatically cranks the engine to restart.

However, it is insufficient to improve fuel economy by performing the fuel cut only when the vehicle is stopped. JP-2002-274224A (U.S. Pat. No. 6,702,718) and JP-8-189395A show that a fuel cut is performed to stop the engine also when the vehicle is decelerated and the vehicle may be stopped.

In the idle reduction control system shown in JP-2002-274224A, when the vehicle is decelerated and the engine is automatically stopped, a gear of the transmission mechanism is changed to a specific gear having a one-way clutch to interrupt a transmission of a driving power from the driving shaft to the engine. The engine is stopped rapidly to pass through a resonant vibration region of the vehicle so that a vehicle vibration is reduced.

However, when the engine is rapidly stopped, an intake air pressure which is a negative-pressure source of a brake is rapidly increased to atmospheric pressure. Thus, if the engine is rapidly stopped in a deceleration condition of the vehicle by the idle reduction control, a brake performance may be deteriorated. Besides, in a vehicle equipped with the idle reduction control system, an electric hydraulic pump driven by a battery is used as a hydraulic pump for driving engine in order to ensure the hydraulic pressure of the automatic transmission during an engine stop period by the idle reduction control. When the engine is rapidly stopped by the idle reduction control before the vehicle is stopped, a driving period of the electric hydraulic pump is prolonged and an electric power consumption of the electric hydraulic pump (battery discharge) is increased. In view of ensuring an amount of charge of the battery, a battery-charge control system restricts the idle reduction period, so that an improvement of fuel economy is deteriorated.

JP-8-189395A shows a vehicle equipped with a transmission including a clutch of which torque clutch capacity is electrically adjustable. In this vehicle, while the fuel cut is performed to automatically stop the engine of the vehicle which is decelerated, a clutch is engaged until a specified clutch disengage condition is satisfied, so that an effective region of the engine brake is enlarged. When the specified clutch disengage condition is satisfied, the clutch is disengaged to interrupt the driving power transmission from the driving shaft to the engine, so that a vehicle vibration is reduced at the engine stop.

However, in the above configuration, since the clutch is engaged between the driving shaft and the engine until the clutch disengage condition is satisfied, it is likely that a large shock is directly transmitted from the driving shaft to the engine if a disengaging timing of the clutch is delayed even slightly. In contrast, if the clutch is disengaged early, the effective region of the engine brake is decreased.

SUMMARY OF THE INVENTION

The present invention is made in view of the above matters, and it is an object of the present invention to provide an automatic stop/start controller for an internal combustion engine which can improve a brake performance, improve a fuel economy, and reduce a shock when a vehicle is decelerated to automatically stop the internal combustion engine.

According to the present invention, an automatic stop/start controller for an internal combustion engine includes an automatic stop control means for stopping a fuel injection at a time when a vehicle is in a specified decelerate condition where the vehicle likely stops and an automatic stop requirement is generated, and an automatic start control means for restarting the internal combustion engine by restarting the fuel injection at a time when a restart requirement is generated during a fuel injection stop period generated by the automatic stop control means. The automatic stop control means performs a control operation in which the input shaft and the output shaft of the shift transmission mechanism are directly connected with each other by the direct connecting means when the fuel injection is stopped based on the automatic stop requirement. A driving power is transmitted from the internal combustion engine to the driving shaft through a power transmitting means.

The engine is rotated by a vehicle decelerate energy transmitted from the driving shaft to the engine through the power transmitting means during a fuel injection stop period, so that a decrease in engine speed becomes moderate. Therefore, an engine driving period from a time when the fuel injection stop period is started (a time when the automatic stop requirement is generated) to a time when the engine is stopped is prolonged, so that the time period for ensuring the intake air pressure which is the negative-pressure source of a brake is prolonged. A brake performance is improved during the fuel injection stop period.

Besides, in a case that the present invention is applied to a vehicle equipped with an electric hydraulic pump for ensuring hydraulic pressure of the automatic transmission during an automatic stop (idle reduction) of the internal combustion engine, the driving period of the electric hydraulic pump is shortened by a specified period corresponding to the prolonged engine driving period. The electric power consumption of the electric hydraulic pump (discharge quantity of a battery) is reduced to improve the fuel economy.

Furthermore, since the power transmitting means permits sliding between the input shaft and the output shaft thereof, a shock transmitted from the driving shaft to the engine at the time of stopping the engine is absorbed by the sliding between the input shaft and the output shaft of the power transmitting means, so that a vehicle shock which a passenger feels can be reduced.

Besides, according to the present embodiment, the engine driving period from a time when the fuel injection stop period is started to a time when the engine is stopped is prolonged, and the time period in which the engine can be restarted only by the fuel injection without using the starter is prolonged. Correspondingly, the operation frequency of the starter is reduced to extend the product lifetime of the starter.

In a case that the restart requirement is generated before the vehicle is completely stopped during the fuel injection stop period, the direct connector is released to cancel a direct connecting condition between the input shaft and the output shaft of the shift transmission mechanism when a difference between the engine speed and a rotation speed of the input shaft of the shift transmission mechanism (a differential speed between an input shaft and an output shaft of the power transmitting means) becomes within a specified value, for example, approximately zero.

According to the above configuration, in a case that the restart requirement is generated before the vehicle is completely stopped during the fuel injection stop period, since the engine is restarted under a condition where the input shaft and the output shaft of the shift transmission mechanism are directly connected with each other by the direct connecting means, the vehicle decelerate energy is transmitted from the driving shaft to the engine through the power transmitting means. In a condition where the engine is driven by the vehicle decelerate energy, the fuel injection can be restarted to restart the engine 11. Therefore, the engine can be restarted only by the fuel injection without using the starter 12. Alternatively, a torque of the vehicle decelerate energy is added to a cranking torque of the starter, whereby the engine is cranked by a large torque to improve the restartability of the engine. After the engine is restarted, when the difference between the engine speed and the rotation speed of the input shaft of the shift transmission mechanism becomes within the specified value, for example, approximately zero, the direct connecting means is released to cancel the direct connecting condition between the input shaft and the output shaft of the shift transmission mechanism. Thus, the shock is reduced or prevented in canceling the direct connection of the shift transmission mechanism.

However, if the direct connection of the shift transmission mechanism is maintained even after the vehicle is completely stopped, the cranking of the engine by the starter is interrupted by inertia of the driving shaft to deteriorate the restartability.

In order to solve the above problem, in a case that the restart requirement is not generated by the time when the vehicle is completely stopped during the fuel injection stop period, the direct connection means is released to cancel the direct connection of the shift transmission mechanism at the time when the vehicle is completely stopped. Thus, when the restart requirement is generated after the vehicle is completely stopped, the cranking of the engine by the starter is not interrupted by the driving shaft and restartability is not deteriorated.

Besides, in a case that the shift transmission mechanism is the gear shift mechanism, the gear shift mechanism has gears which can not be connected directly. When the input shaft and the output shaft of the shift transmission mechanism will be directly connected with each other, if the gear of the gear shift mechanism can not be directly connected, the gear is changed to another gear directly connectable so that the input shaft and the output shaft of the shift transmission mechanism are directly connected with each other by the direct connecting means.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter.

Figure 1:
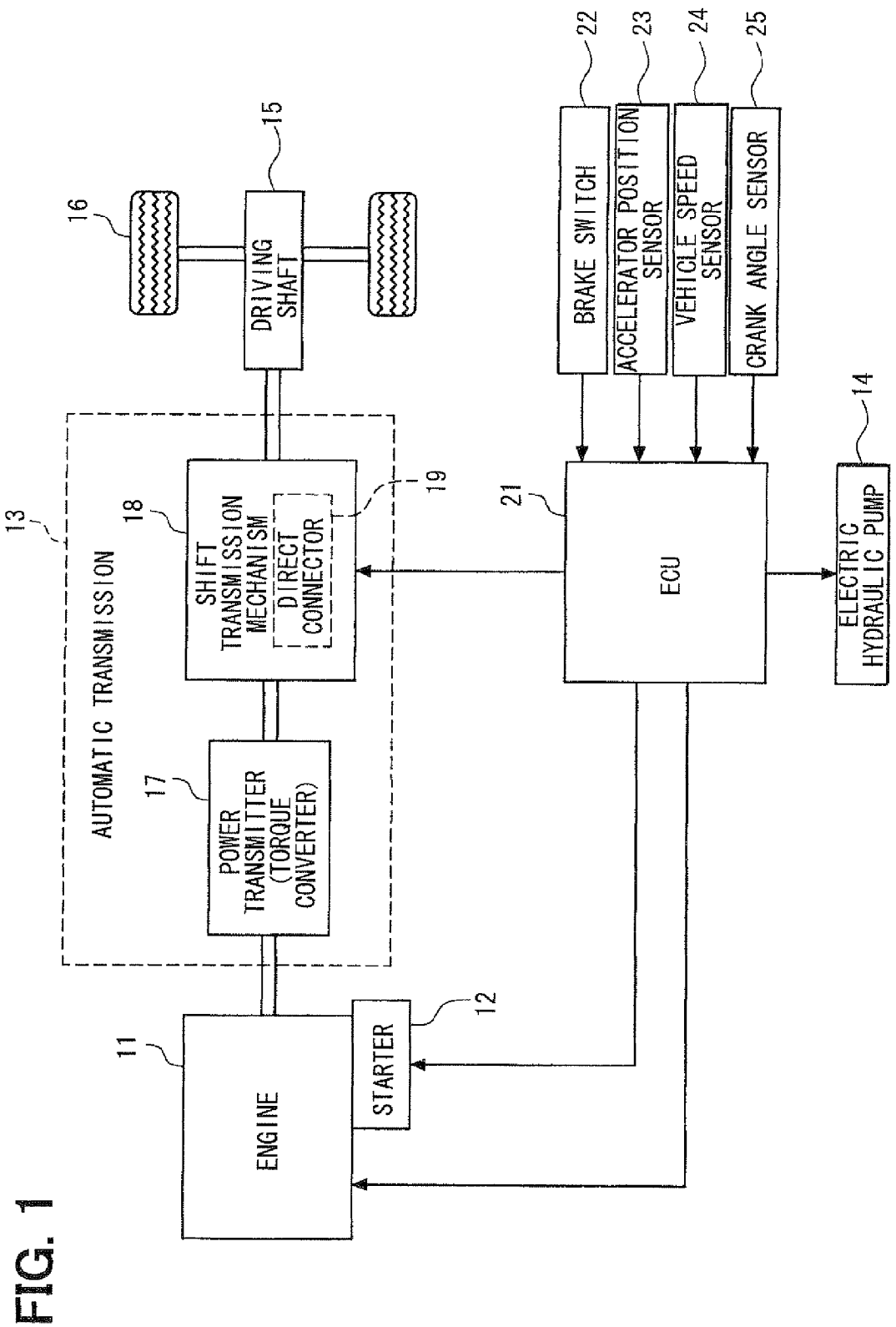
FIG. 1 is a block diagram showing a schematic configuration of an engine automatic stop/start controller according to an embodiment of the present invention.

Referring to FIG. 1, a schematic configuration of an automatic engine stop/start controller will be described. An internal combustion engine 11 is a gasoline engine or a diesel engine. Further, the engine 11 is an intake port injection engine, a direct injection engine, or a dual injection engine having a fuel injector for intake port injection and a fuel injector for direct injection.

The engine 11 is provided with a starter 12 cranking the engine 11, a hydraulic pump (not shown) driven by the engine 11, and the like. An electric hydraulic pump 14 is provided in order to ensure hydraulic pressure of an automatic transmission 13 while the engine 11 is automatically stopped (idle reduction).

The starter 12 has a pinion engaged with a ring gear which is connected to a crankshaft of the engine 11 so that the engine 11 is cranked any time according to a restart requirement. Alternatively, a pinion is disengaged during an engine operation. When the restart requirement is generated during a period in which the engine is decelerated, the pinion is rotated by a motor to be brought into synchronization with the ring gear. When the rotational speed difference therebetween becomes small, the pinion gear is engaged with the ring gear to start cranking the engine 11.

The driving power of the engine 11 is transmitted to the driving shaft 15 through the automatic transmission 13 to drive wheels 16. The automatic transmission 13 is comprised of a power transmitter 17 (power transmitting means), a shift transmission mechanism 18, and a direct connector 19 (direct connecting means) capable of directly connecting an input shaft with an output shaft of the shift transmission mechanism 18. The power transmitter 17 permits sliding between the input shaft and the output shaft. For example, the power transmitter 17 is a torque converter, a fluid coupling, or a clutch permitting sliding by mechanical friction.

The shift transmission mechanism 18 may be a gear shift mechanism or a continuously variable transmission (CVT). The gear shift mechanism has a plurality of gears and the gear is stepwise shifted.

In a case that the shift transmission mechanism 18 is a gear shift mechanism, the direct connector 19 is a frictional engaging element (clutch, brake etc.) for changing the gear. In a case that the shift transmission mechanism 18 is the CVT, the direct connector 19 is a frictional engaging element (clutch, brake etc.) of a forward-rearward changing mechanism of the CVT. The driving shaft 15 is comprised of a propeller shaft, a differential and the like.

An electronic control unit (ECU) 21 controlling the engine 11, the starter 12, and the shift transmission mechanism 18 is comprised of a plurality of electronic control unit, such as an engine ECU, an automatic transmission ECU, and an idle stop ECU. The ECU 21 receives signals from various sensors detecting engine drive condition. For example, the ECU 21 receives signals from a brake switch 22 detecting ON/OFF of brake operation, an accelerator position sensor 23 detecting an accelerator position, a vehicle speed sensor 24 detecting a vehicle speed, and a crank angle sensor 25 outputting crank angle pulse signals at a specified crank angle interval in synchronization with a crankshaft of the engine 11. An engine speed is computed based on cycle (frequency) of the crank angle pulse signals.

During the engine driving, the ECU 21 controls a fuel injection quantity, an intake air quantity (throttle opening degree), an ignition timing and the like according to the engine driving condition. Further, the ECU 21 determines whether the vehicle is decelerated to be in a specified decelerated condition where the vehicle likely stops. That is, the ECU 21 determines whether an automatic stop requirement is generated. In this determination, the ECU 21 determines whether following three conditions are satisfied. (1) The accelerator is not pressed (throttle valve is fully closed). (2) The brake pedal is pressed. (3) The vehicle speed is lower than a predetermined speed. When the above three conditions have been satisfied for a specified time period, the ECU 21 determines that the vehicle is in the specified decelerated condition. Besides, the determination method of the specified decelerated condition can be modified.

At the time when the ECU 21 determines that the vehicle is in the specified decelerated condition, the ECU 21 determines that the automatic stop requirement (idle reduction requirement) is generated, so that the fuel injection is stopped (fuel cut) to automatically stop the engine 11. Then, when the driver operates to restart the vehicle (the driver releases the brake pedal, steps the accelerator, operates a shift lever to drive range), the engine restart requirement is generated to restart the engine. In some cases, the engine restart requirement is generated by a battery charge control system or an air-conditioning system to restart the engine 11.

Figure 2:
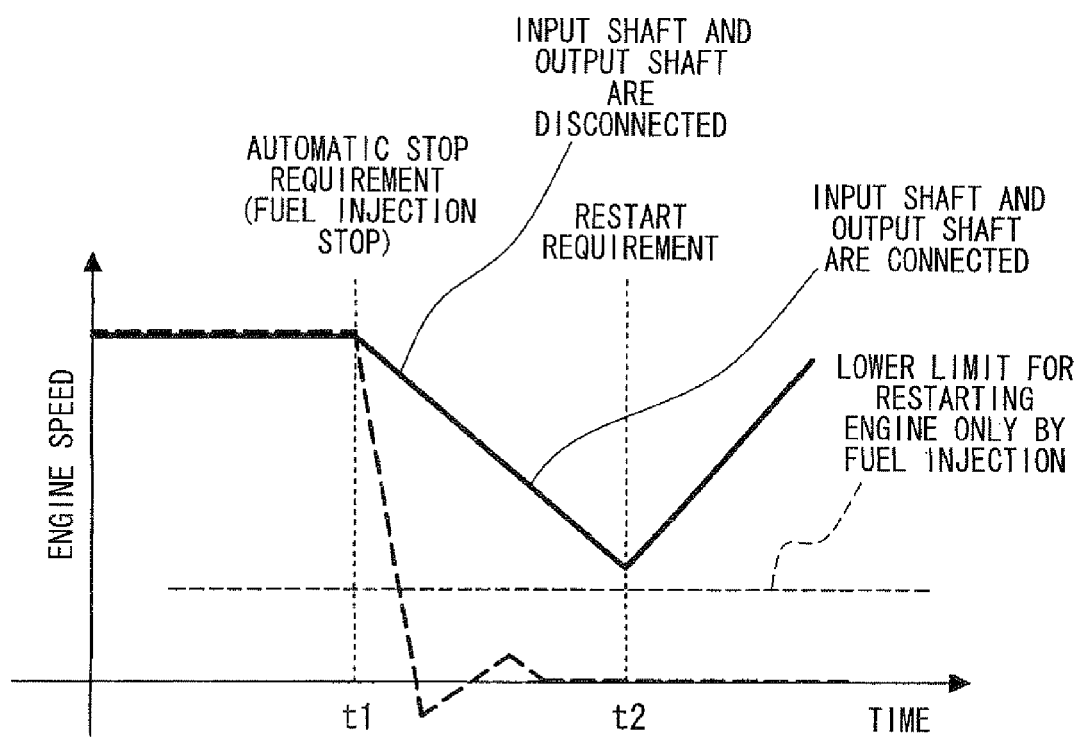
FIG. 2 is a chart for explaining a relationship between an engine speed behavior and a connect/disconnect condition of an input shaft and an output shaft of a shift transmission mechanism after a fuel injection stop period is started.

When the fuel injection is stopped based on the automatic stop requirement, a combustion in a cylinder is not performed and the engine 11 can not run by itself. Thus, if the input shaft and the output shaft of the shift transmission mechanism 18 are disconnected, the engine speed is rapidly decreased right after the fuel injection is stopped, as shown by dashed line in FIG. 2, and the engine 11 instantaneously stops. Thereby, a time period in which the engine can be restarted only by fuel injection without using the starter 12 is decreased, so that an operation frequency of the starter 12 is likely increased and a product lifetime of the starter 12 is likely shortened. Further, when the engine 11 is stopped, the intake air pressure which is a negative-pressure source of a brake is rapidly increased to atmospheric pressure. Thus, when the engine 11 is rapidly stopped by the idle reduction control, the brake performance may be deteriorated. Further, when the engine 11 is rapidly stopped by the idle reduction control before the vehicle is stopped, a driving period of the electric hydraulic pump 14 is prolonged and electric power consumption of the electric hydraulic pump 14 (discharge quantity of a battery) is increased. In view of ensuring a battery charge amount, the battery charge control system restricts the idle reduction period, so that the improvement of fuel economy is deteriorated According to the present embodiment, when the fuel injection is stopped by the idle reduction control in the specified decelerated condition, the input shaft and the output shaft of the shift transmission mechanism 18 are directly connected with each other by the direct connector 19, so that the driving power can be transmitted between the driving shaft 15 and the engine 11 through the power transmitter 17. Thereby, the engine 11 is driven by a vehicle decelerate energy which is transmitted from the driving shaft 15 to the engine 11 through the power transmitter 17 during a fuel injection stop period. As the result, as shown by a solid line in FIG. 2, a decrease in engine speed becomes moderate after the fuel injection stop period is started (after the automatic stop requirement is generated). Therefore, an engine driving period from a time when the fuel injection stop period is started to a time when the engine 11 is stopped is prolonged, so that the time period for ensuring the intake air pressure which is the negative-pressure source of a brake is prolonged. The brake performance is improved during the fuel injection stop period, and the driving period of the electric hydraulic pump 14 is shortened. The electric power consumption of the electric hydraulic pump 14 is reduced to improve the fuel economy.

Furthermore, since the power transmitter 17 permits sliding between the input shaft and the output shaft, a shock transmitted from the driving shaft 15 to the engine 11 at the time of stopping the engine 11 is absorbed by the sliding between the input shaft and the output shaft of the power transmitter 17, so that a vehicle shock which a passenger feels can be reduced.

Besides, according to the present embodiment, the engine driving period from a time when the fuel injection stop period is started to the time when the engine 11 is stopped is prolonged, and the time period in which the engine can be restarted only by the fuel injection without using the starter 12 is prolonged. The operation frequency of the starter 12 is reduced to extend the product lifetime of the starter 12.

Figure 3:
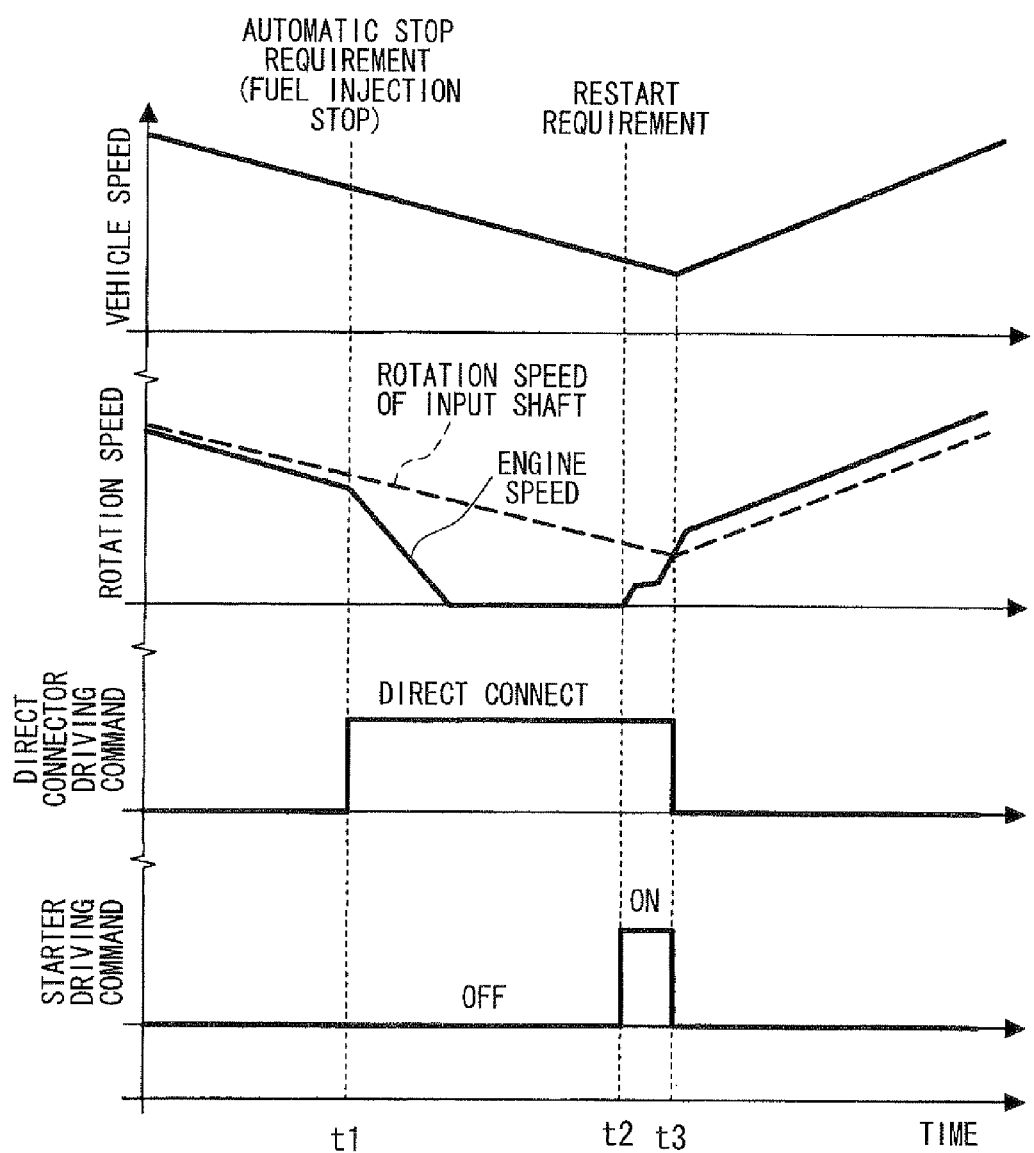
FIG. 3 is a time chart for explaining a control in a case that a restart requirement is generated before a vehicle is completely stopped during the fuel injection stop period.

In the present embodiment, as shown in FIG. 3, in a case that the restart requirement is generated before the vehicle is completely stopped during the fuel injection stop period, the direct connector 19 is released to cancel the direct connecting condition between the input shaft and the output shaft of the shift transmission mechanism 18 when a difference between the engine speed and a rotation speed of the input shaft of the shift transmission mechanism 18 becomes within a specified value, for example, approximately zero.

In a case that the restart requirement is generated before the vehicle is completely stopped during the fuel injection stop period, since the engine 11 is restarted under a condition where the input shaft and the output shaft of the shift transmission mechanism 18 are directly connected with each other by the direct connector 19, the vehicle decelerate energy is transmitted from the driving shaft 15 to the engine 11 through the power transmitter 17. In a condition where the engine ills driven by the vehicle decelerate energy, the fuel injection is restarted to restart the engine 11. Therefore, the engine 11 can be restarted only by the fuel injection without using the starter 12. Alternatively, a torque of the vehicle decelerate energy is added to a cranking torque of the starter 12, whereby the engine 11 is cranked by a large torque to improve the restartability of the engine 11.

After the engine 11 is restarted, when the difference between the engine speed and the rotation speed of the input shaft of the shift transmission mechanism 18 becomes within the specified value, for example, approximately zero, the direct connector 19 is released to cancel the direct connecting condition between the input shaft and the output shaft of the shift transmission mechanism 18. Thus, the shock is reduced or prevented in canceling the direct connection of the shift transmission mechanism 18.

However, if the direct connection of the shift transmission mechanism 18 is maintained even after the vehicle is completely stopped, the cranking of the engine 11 by the starter 12 is interrupted by inertia of the driving shaft 15 to deteriorate the restartability.

Figure 4:
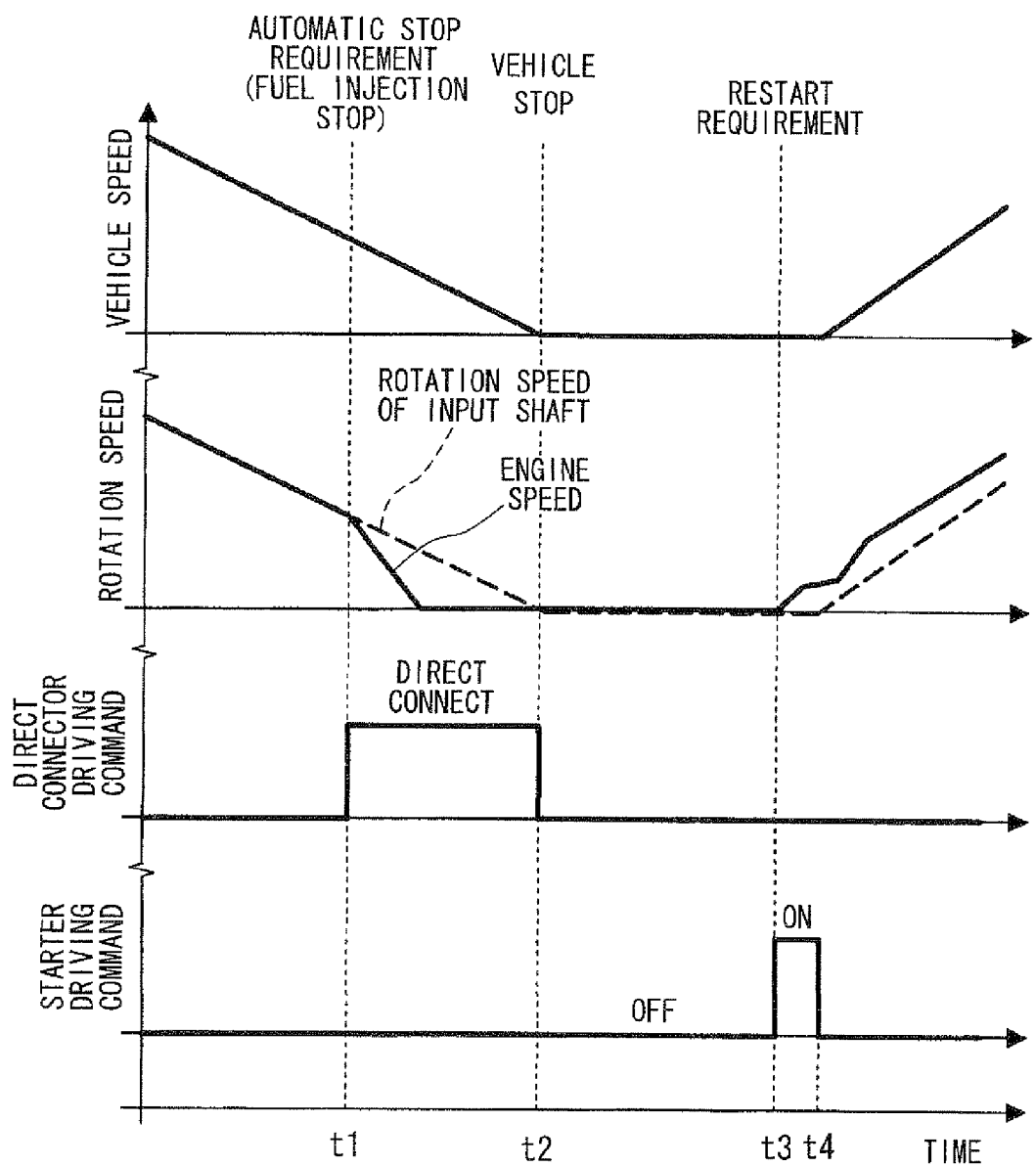
FIG. 4 is a time chart for explaining a control in a case that a restart requirement is not generated before a vehicle is completely stopped during the fuel injection stop period.

According to the present invention, as shown in FIG. 4, in a case that the restart requirement is not generated by the time when the vehicle is completely stopped during the fuel injection stop period, the direct connector 19 is released to cancel the direct connection of the shift transmission mechanism 18 at the time when the vehicle is completely stopped. Thus, when the restart requirement is generated after the vehicle is completely stopped, the cranking of the engine 11 by the starter 12 is not interrupted by the driving shaft 15 and restartability is not deteriorated.

Besides, in a case that the shift transmission mechanism 18 is the gear shift mechanism, the gear shift mechanism 18 has gears which can not be connected directly, for example, 1 speeds gear and 2 speeds gear. When the input shaft and the output shaft of the shift transmission mechanism 18 will be directly connected with each other, if the gear of the gear shift mechanism 18 can not be directly connected, the gear is changed to another gear directly connectable so that the input shaft and the output shaft of the shift transmission mechanism 18 are directly connected with each other by the direct connector 19.

As described above, the time chart shown in FIG. 3 shows a control in which the restart requirement is generated before the vehicle is completely stopped during the fuel injection stop period. In this control, at a time of t1 when the automatic stop requirement is generated during deceleration of the vehicle, the fuel injection is stopped and the input shaft and the output shaft of the shift transmission mechanism 18 are directly connected with each other by the direct connector 19 so that the driving power can be transmitted between the driving shaft 15 and the engine 11 through the power transmitter 17.

Then, at a time of t2 when the restart requirement is generated before the vehicle is completely stopped, the fuel injection is restarted to restart the engine 11. As shown by a solid line in FIG. 2, if the engine speed is within a starterless-start range at the time of t2, the engine 11 is restarted by the fuel injection without using the starter 12. The starterless-start range represents an engine speed range in which the engine 11 can be restarted by the fuel injection without using the starter 12. However, in the control shown in FIG. 3, since the engine speed is lower than the starterless-start range at the time of t2, the starter 12 cranks the engine 11 and the fuel injection is restarted to restart the engine 11. Then, at the time of t3 when the difference between the engine speed and the rotation speed of the input shaft of the shift transmission mechanism 18 becomes within the specified value, for example, approximately zero, the direct connector 19 is released to cancel the direct connecting condition between the input shaft and the output shaft of the shift transmission mechanism 18.

Besides, when the engine speed of the restarted engine exceeds a start-completion value, the starter 12 is stopped. In the control shown in FIG. 3, the timing when the engine speed exceeds the start-completion value and the starter 12 is stopped is almost the same time as the time of t3.

A time chart shown in FIG. 4 shows a control in which the restart requirement is not generated by the time when the vehicle is completely stopped during the fuel injection stop period. In a case that the restart requirement is not generated by the time when the vehicle is completely stopped, the direct connector 19 is released to cancel the direct connection of the shift transmission mechanism 18 at the time of t2 when the vehicle is completely stopped. Thereby, the engine 11 is completely stopped. After that, at the time of t3 when the restart requirement is generated, the starter 12 cranks the engine 11 and the fuel injection is restarted to restart the engine 11. At the time of t4 when the engine speed exceeds the start-completion value, the starter 12 is stopped.

Figure 5:
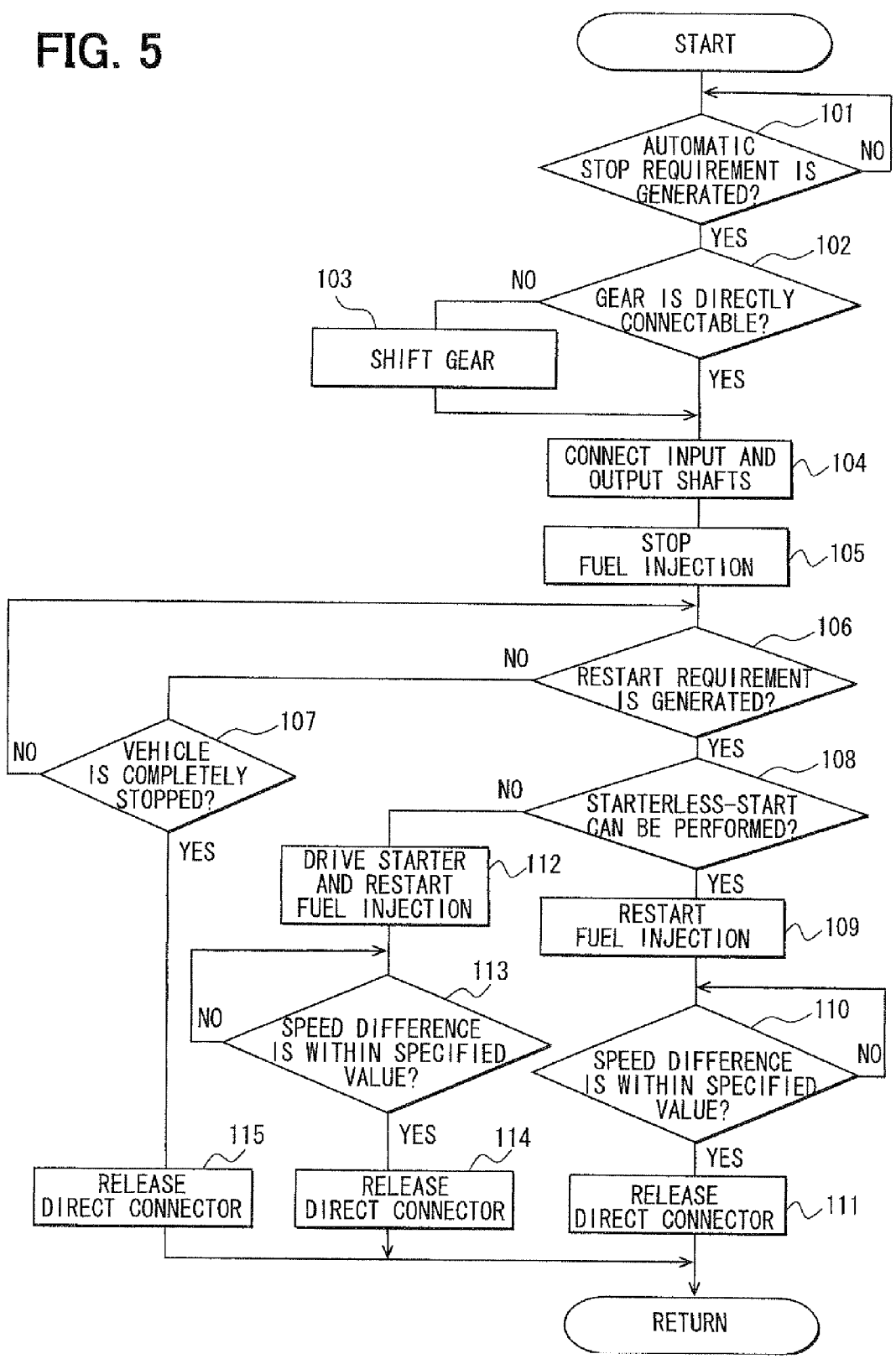
FIG. 5 is a flowchart showing an idle reduction control program.

The idle reduction control described above is executed by the ECU 21 according to an idle reduction control program shown in FIG. 5. The idle reduction control program is repeatedly executed periodically while the ECU 21 is ON. This program corresponds to an automatic stop control means and an automatic start control means.

In step 101, the ECU 21 determines whether the vehicle is decelerated and the automatic stop requirement (idle stop requirement) is generated. If the automatic stop requirement is not generated, the process of step 101 is repeated until the automatic stop requirement is generated. When the automatic stop requirement is generated, the procedure proceeds to step 102 in which the ECU 21 determines whether the present gear is directly connectable. When the answer is No, the procedure proceeds to step 103 in which the present gear is shifted to a connectable gear. Then, the procedure proceeds to step 104 in which the input shaft and the output shaft of the shift transmission mechanism 18 are connected with each other by the direct connector 19.

When the answer is Yes in step 102, the procedure proceeds to step 104. Then, the procedure proceeds to step 105 in which the fuel injection is stopped. Besides, the process of step 104 and the process of step 105 may be executed virtually simultaneously. After the process of step 105 is executed, the process of step 104 may be executed.

Then, the procedure proceeds to step 106 in which the ECU 21 determines whether the restart requirement is generated. When the answer is No in step 106, the procedure proceeds to step 107 in which the ECU 21 determines whether the vehicle is completely stopped. If the vehicle is not completely stopped, the procedure goes back to step 106. Thereby, after the automatic stop requirement is generated, until the restart requirement is generated or the vehicle is completely stopped, the determination processes of step 106 and step 107 are repeatedly performed.

When the restart requirement is generated before the vehicle is completely stopped, the ECU 21 determines that the answer in step 106 is Yes and the procedure proceeds to step 108. In step 108, the ECU 21 determines whether the starterless-start can be performed based on whether the present engine speed is within the starterless-start range. When the ECU 21 determines that the starterless-start can be performed, the procedure proceeds to step 109 in which the fuel injection is restarted to restart the engine 11 which is driven by the vehicle decelerate energy without using the starter 12.

Then, the procedure proceeds to step 110 in which the ECU 21 determines whether the difference between the engine speed and the rotation speed of the input shaft of the shift transmission mechanism 18 becomes within the specified value, for example, approximately zero. When the difference is greater than the specified value, the process of step 110 is repeatedly performed until the difference becomes less than or equal to the specified value. At the time when the difference becomes less than or equal to the specified value, the procedure proceeds to step 111 in which the direct connector 19 is released to cancel the direct connection of the shift transmission mechanism 18.

When the ECU 21 determines that the starterless-start can not be performed in step 108, the procedure proceeds to step 112 in which the starter 12 is driven to crank the engine 11 and the fuel injection is restarted to restart the engine 11. Then, the procedure proceeds to step 113 in which the ECU 21 determines whether the difference between the engine speed and the rotation speed of the input shaft of the shift transmission mechanism 18 becomes within the specified value, for example, approximately zero. When the difference is greater than the specified value, the process of step 113 is repeatedly performed until the difference becomes less than or equal to the specified value. At the time when the difference becomes less than or equal to the specified value, the procedure proceeds to step 114 in which the direct connector 19 is released to cancel the direct connection of the shift transmission mechanism 18.

On the other hand, in a case that the restart requirement is not generated by the time when the vehicle is completely stopped (the answer in step 106 is No), at the time when the vehicle is completely stopped, the ECU 21 determines that the answer is Yes in step 107 and the procedure proceeds to step 115 in which the direct connector 19 is released to cancel the direct connection of the shift transmission mechanism 18.

According to the above described embodiment, when a vehicle is in the specified decelerated condition where the vehicle likely stops and the fuel injection is stopped by the idle reduction control, the input shaft and the output shaft of the shift transmission mechanism 18 are directly connected with each other by the direct connector 19 and the driving power can be transmitted from the engine 11 to driving shaft 15 through the power transmitter 17 which permits sliding between the input shaft and the output shaft. Thus, the break performance and the fuel economy can be improved and the vehicle shock can be reduced.

What is claimed is:

1. An automatic stop/start controller for an internal combustion engine of a vehicle equipped with an automatic transmission having a power transmitting means which permits a sliding between an input shaft and an output shaft thereof, a shift transmission mechanism, and a direct connecting means for connecting an input shaft and an output shaft of the shift transmission mechanism, the automatic transmission transmitting a driving power of the internal combustion engine to a driving shaft, the automatic stop/start controller comprising:

an automatic stop control means for stopping a fuel injection at a time when the vehicle is in a specified decelerate condition where the vehicle likely stops and an automatic stop requirement is generated; and an automatic start control means for restarting the internal combustion engine by restarting the fuel injection at a time when a restart requirement is generated during a fuel injection stop period generated by the automatic stop control means, wherein the automatic stop control means performs a control in which the input shaft and the output shaft of the shift transmission mechanism are directly connected with each other by the direct connecting means when the fuel injection is stopped based on the automatic stop requirement, whereby the driving power is transmitted from the internal combustion engine to the driving shaft through the power transmitting means.

2. An automatic stop/start controller for an internal combustion engine according to claim 1, wherein
   in a case that the restart requirement is generated before the vehicle is completely stopped during the fuel injection stop period, the automatic stop control means cancels a direct connecting condition where the input shaft and the output shaft of the shift transmission mechanism are directly connected with each other by the direct connecting means, when a difference between a rotational speed of the internal combustion engine and a rotational speed of the input shaft of the shift transmission mechanism becomes within a specified value after the internal combustion engine is restarted by the automatic start control means.

3. An automatic stop/start controller for an internal combustion engine according to claim 1, wherein
   in a case that the restart requirement is not generated before the vehicle is completely stopped during the fuel injection stop period, the automatic stop control means cancels a direct connecting condition where the input shaft and the output shaft of the shift transmission mechanism are directly connected with each other by the direct connecting means, when the vehicle is completely stopped.

4. An automatic stop/start controller for an internal combustion engine according to claim 1, wherein
   the shift transmission mechanism has a gear which is unconnectable directly, and
   in a case that the gear of the shift transmission mechanism is unconnectable directly when the input shaft and the output shaft of the shift transmission mechanism will be directly connected with each other, the automatic stop control means shifts the unconnectable gear to a connectable gear to directly connect the input shaft and the output shaft of the shift transmission mechanism.

* * * * *